United States Patent [19]

Isobe et al.

[11] Patent Number: 5,328,943
[45] Date of Patent: Jul. 12, 1994

[54] ASPHALT COMPOSITIONS FOR PAVEMENT

[75] Inventors: Masao Isobe; Yoshio Aizawa, both of Yokohama, Japan

[73] Assignee: Nippon Oil Co., Ltd., Tokyo, Japan

[21] Appl. No.: 918,822

[22] Filed: Jul. 22, 1992

[30] Foreign Application Priority Data

Jul. 24, 1991 [JP] Japan ................. 3-207366

[51] Int. Cl.⁵ ............................. C08L 95/00
[52] U.S. Cl. ........................ 524/70; 524/68
[58] Field of Search .......... 524/68, 70; 525/55

[56] References Cited

U.S. PATENT DOCUMENTS

| | | | |
|---|---|---|---|
| 4,387,175 | 6/1983 | Böhm et al. | 524/68 |
| 4,837,252 | 6/1989 | Seguin et al. | 524/70 |
| 4,973,615 | 11/1990 | Futamura et al. | 524/70 |
| 5,023,282 | 6/1991 | Neubert | 524/70 |
| 5,070,123 | 12/1991 | Moran | 524/70 |

FOREIGN PATENT DOCUMENTS 0009432  4/1980  European Pat. Off. ........... 524/68

*Primary Examiner*—Paul R. Michl
*Assistant Examiner*—LaVonda DeWitt
*Attorney, Agent, or Firm*—Panitch Schwarze Jacobs & Nadel

[57] ABSTRACT

An asphalt composition for use in road pavements is disclosed which comprises chiefly of an asphalt of natural or petroleum origin, a thermoplastic elastomer and/or a styrene-butadiene rubber and a low molecular weight polypropylene. These components are premixed or plant-mixed to form a reformed asphalt which is mixed with an aggregate to provide a paving material having increased compression strength, increased low temperature viscosity and decreased high temperature viscosity.

7 Claims, No Drawings

ASPHALT COMPOSITIONS FOR PAVEMENT

BACKGROUND OF THE INVENTION

1. Field of the Invention

This invention relates to asphalt compositions for use in the manufacture of pavement materials for paving traffic roads, walkways, air-port runways park lots and the like.

2. Prior Art

Conventional pavements chiefly comprised of straight asphalt have been often found defective when applied to roads susceptible to deformation or damage by heavy weight traffic, or under cold or snowy environmental conditions where tire chains or spiked tires are used. Typical solutions to this problem have been to admix an asphalt matrix with reformers such as natural rubber, SBR, butadiene rubber, isoprene rubber, or thermoplastic elastomers such as block copolymers of styrene-butadiene-styrene, styrene-isoprene-styrene and the like. Such reforming agents are known for their ability to reduce asphalt's thermal response, fluid deformation and frictional wear of asphalt-paved roads as well as to improve other asphalt characteristics including adhesion with aggregates and flexibility at low temperature.

There are currently used asphalt pavements containing certain open graded asphalt mixtures conducive to water penetration and drainage with a view to providing increased resistance to road slip and preventing water splash and a so-called "hydroplaning". Such pavements comprised of straight asphalt alone would be insufficient in compressive strength and water resistance, but these physical properties could be improved with use of the aforesaid reformers as is well known to one skilled in the art.

Those asphalt compositions which incorporate reforming agents tend to have high temperature viscosity considerably increased as compared to straight asphalt. It is therefore necessary to choose a relatively high temperature level for mixing reformed asphalt with aggregates in the preparation of a paving material. The working temperature at the site of construction would also have to be increased for roll-flattening the paved road surface to an extent to make the paving operation tedious and time-consuming.

So much more reformers would be required to achieve a target compressive strength of pavement for roads frequented by heavy traffic of large vehicles, or where water permeation is an important parameter. The use of increased amounts of reformers would lead to increased high temperature viscosity of reformed asphalt and hence aggravated paving operation.

SUMMARY OF THE INVENTION

With the foregoing difficulties of the prior art in view, the present invention seeks to provide an asphalt composition which has increased viscosity at a low temperature, typically at 60° C., and reduced viscosity at a high temperature, typically at 180° C.

The invention further seeks to provide an asphalt composition which can be mixed for example with suitable aggregates to form a paving material having significantly high compressive strength.

These and other features and advantages of the invention will become manifest upon reference to the following detailed description.

An asphalt composition according to the invention comprises an asphalt, a first essential component (A) which is a thermoplastic elastomer and/or styrene-butadiene-rubber and a second essential component (B) which is a low molecular weight polypropylene.

DETAILED DESCRIPTION OF THE INVENTION

The term asphalt as used herein designates a variety of asphalts including naturally occurring asphalt, petroleum asphalt and mixtures thereof. Naturally occurring asphalts may be exemplified by gilsonite, grahamite, and Trinidad lake asphalt. Typical examples of petroleum asphalt include straight asphalt of different penetration grades, blown or semi-blown asphalt and solvent deasphalted asphalt, mixtures of these asphalts being also eligible for the purpose of the invention. All of the mentioned asphalts are widely known for use in road pavements.

Particularly suitable for the purpose of the invention is a straight asphalt having a 25° C. penetration in the range of 40–150, preferably 60–120 and a softening point in the range of 40°–55° C., preferably 42°–50° C. Asphalts according to the invention are used in an amount of 82–96 weight %, preferably 88–95 weight % on total composition basis.

The first component (A) of the inventive composition is a thermoplastic elastomer typically exemplified by a block copolymer of styrene and conjugated dienes and partial hydrogenates thereof represented by the general formula A-B-A or A-B-A-B where A is a styrene polymer block and B is a conjugated diene polymer block such as of butadiene and isoprene. A preferred block copolymer for use in the invention is one which has a polystyrene block at terminal ends and a polybutadiene block therebetween, and a polystyrene ratio of 15–40 percent by weight and an average molecular weight of 5,000–200,000. The use of such an elastomer is advantageous in that it has less molecular weight than ordinary rubber and is thermoplastic and compatible with asphalt. These elastomers may be used alone or in combination with other elastomers of different grade in terms of average molecular weight and/or styrene contents.

An alternative of the first component (A) according to the invention is a styrene-butadiene rubber, i.e., SBR, more specifically a random copolymer of styrene and butadiene which is derivable from emulsification or solution polymerization. The random copolymers resulting from emulsification polymerization are in the form of a latex or a solid and preferably have a styrene content of 15–40 weight % and a Mooney viscosity of 10–100. A latex type SBR has a solids content of preferably 30–70 weight % and a rubber particle size of preferably 0.03–1 micron. Those SBRs available from solution polymerization assume a cloddly shape and have a styrene content of preferably 15–40 weight % and a Mooney viscosity of 30–80. Styrene contents are more preferably in the range of 20–30 weight regardless of how SBRs are prepared.

According to the invention, either or both of the thermoplastic elastomers and the styrene-butadiene rubber are used in an amount of 0–12, preferably 3–8 weight % based on total composition. Component (A) as a whole is used in an amount of 3–12, preferably 4–8 weight % based on total composition.

It has been found that Component (A) of the inventive asphalt composition when comprised predominantly of a thermoplastic elastomer provides reduced high temperature viscosity and increased toughness/tenacity of the resultant composition, whilst Component (A) when comprised predominantly of SBR provides improved elongation at low temperature.

The term low molecular weight polypropylene, i.e., Component (B), as used herein designates a polypropylene having an average molecular weight in the range of 2,000–5,000. Lower average molecular weights would lead to no appreciable increase in 60° C. viscosity of the asphalt composition, or no significant increase in compression strength of the asphalt mixture obtained. Whereas, higher average molecular weights would result in incompatibility with asphalt and less elongation of the asphalt composition. Component (B) has a softening point of 80°–170° C., preferably 120°–150° C. Lower softening points would lead to no appreciable increase in 60° C. viscosity of the asphalt composition, or no significant improvement in compressive strength of the asphalt mixture. Higher softening points would result in incompatibility with asphalt and less elongation of the asphalt composition. Component (B) has a 160° C. viscosity not exceeding 500 cp, preferably less than 300 cp, as higher viscosities would provide undue increase in high temperature viscosity of the asphalt composition.

As Component (B), there may be used liquid polypropylene, particulate polypropylene and atactic polypropylene, of which particulate polypropylene is preferred for the purpose of the invention.

There is no particular restriction imposed upon the method of preparing the inventive low molecular weight polypropylene. This polypropylene may be obtained by thermal or oxidation cracking of high molecular weight polypropylene, or by polymerization of propylene in the presence of a Zieglar-type catalyst or peroxides, or by solvent extraction of byproducts formed during the manufacture of high molecular weight polypropylene.

The content of Component (B) in the inventive asphalt composition is generally in the range of 1–6 weight %, preferably in the range of 2–5 weight %, based on total weight of the composition.

There are two methods, though not limited thereto, contemplated for the production of paving materials incorporating the inventive composition. One is a so-called premixing method in which a starting asphalt is mixed with Component (A), i.e., thermoplastic elastomer and/or styrene-butadiene rubber and Component (B), i.e., low molecular weight polypropylene and heated together to form a homogeneous reformed asphalt, followed by mixing under heat with an aggregate material thereby producing an asphalt mixture. The other method is a so-called plant mixing in which all of the materials including an aggregate, an asphalt, Components (A) and (B) are mixed together with heat to form an asphalt mixture for use as a paving material. The pre-mixing method has been found preferable over the plant mixing method. If the latter method is chosen, there should be used a particulate form of thermoplastic elastomer, a latex type SBR and a particulate low molecular weight polypropylene.

The inventive asphalt composition may be added with suitable additives such as an amine-based or calcium hydroxide separation-inhibitor.

The invention will be further described by way of the following examples.

INVENTIVE EXAMPLES 1–8 AND COMPARATIVE EXAMPLES 1–6

In the preparation of an asphalt composition using a solid SBR, suitable amounts of straight asphalt and thermoplastic elastomer and/or SBR were kneaded at 160°–200° C. until the latter was completely dissolved, followed by addition of additional straight asphalt and low molecular weight polypropylene. The whole was stirred at 170°–190° C. for about one hour, until there was obtained an asphalt composition.

With a latex type SBR, suitable amounts of straight asphalt and thermoplastic elastomer were kneaded at 160°–200° C. until the elastomer was completely dissolved, followed by addition of additional straight asphalt, SBR and low molecular weight polypropylene. The admixture was stirred at 170°–190° C. for about one hour, until there was obtained an asphalt composition.

The various components used in the preparation of the above asphalt compositions are identified as follows:

| Straight asphalt | | |
|---|---|---|
| Penetration grade | 80/100 | 60/80 |
| Degree of penetration | 84 | 65 |
| (25° C., 5 g, 5 s) (JIS K2207) | | |
| Softening point (°C.) (JIS K2207) | 44.5 | 49 |
| 60° C. viscosity (P) | 1,480 | 2,240 |
| (Japan Asphalt Institute Standard) | | |
| 180° C. Viscosity (cSt) (JIS K2207) | 61 | 81 |
| Thermoplastic elastomer | A | B |
| Elastomer | styrene-butadiene-styrene | styrene-butadiene-styrene |
| Styrene content (wt %) | 20 | 30 |
| melt index (g/10 min) | 15 | below 1 |
| (ASTM D1238) | | |
| Hardness, HS | 62 | 75 |
| (JIS K6301) | | |
| Elongation, % | 880 | 850 |
| (JIS K6301) | | |
| Specific gravity | 0.93 | 0.94 |
| (ASTM D297) | | |
| Styrene-butadiene rubber (SBR) | A | B |
| Preparation | solution polymerization | emulsion polymerization |
| Styrene content (wt %) | 25 | 25 |
| Mooney viscosity | 56 | 60 |
| (100° C., $ML_{1+4}$) | | |

-continued

| Solids (wt %) | — | 50 |
|---|---|---|
| Low molecular weight polypropylene | A | B |
| Softening point (° C.) (JIS K2531) | 145 | 150 |
| Degree of penetration (25° C., 5 g 5 s) (JIS K2530) | 1.5 | below 1 |
| Viscosity (160° C., cP) (BL viscometer) | 70 | 200 |
| Average molecular weight (steam pressure osmometry) | 3,000 | 4,000 |

The physical properties of the various asphalt compositions obtained in the above examples are shown in Tables 1 and 2. The various components were adjusted in their respective blend ratios such that the resulting asphalt compositions would have a penetration of 40/60 and a 60° C. viscosity of more than 10,000 p. Many other asphalt compositions of different 60/80 penetration and 60° C. viscosity grades may be obtained by choosing different blend ratios of the components.

As is evident from Table 1, the compositions of Inventive Examples 1 to 4 are highly satisfactory in respect of all the tested properties. The composition of Inventive Example 1, though somewhat similar in 180° C. viscosity to that of Comparative Example 1, is acceptable with a conspicuous rise in 60° C. viscosity. In Comparative Example 2, straight asphalt was blended with thermoplastic elastomer alone in order to increase a 60° C. viscosity level beyond 10,000 P, but this composition exhibited an objectionable level of 180° C. viscosity as high as about 250 cSt. The use low molecular weight polypropylene has been found to have no adverse effect on elongation as evidenced by Inventive Examples 2 and 3 in which SBR rubber is blended to improve such property. A combination of straight asphalt with SBR in Comparative Example 3 was found unacceptable with regard to both 60° C. and 180° C. viscosities.

All the seven compositions listed in Table 2 were formulated with larger amounts of reformers to provide increased compression strength for use in water-penetration pavement. The compositions were adjusted in their respective blend ratios so as to have a 60° C. viscosity greater than 100,000 P and a 180° C. viscosity smaller than 550 cSt. Inventive Examples 5 to 8 have been found to meet these viscosity requirements. Comparative Example 4 failed to reach a target level of 100,000 P at 60° C. viscosity even with an adequate level at 180° C viscosity. The reverse was true of Comparative Examples 5 and 6. This demonstrates that the comparative compositions involve handling inconveniences in contrast to the inventive counterparts.

INVENTIVE EXAMPLES 9-16 AND COMPARATIVE EXAMPLES 7-12

As indicated in Table 4, a number of different dense graded and open graded asphalt compositions were prepared. The dense graded and open graded asphalt mixtures were formulated as shown in Table 3. All the compositions were checked for compression strength by the wheel trucking test, details of which are disclosed in "Handbook of Pavement Tests", page 539 (1988), Maruzen Co. The compression strength was adjudged by determining dynamic stability under a set of conditions including an ambient temperature of 60° C., a ground-contacting pressure of 6.5 kg/cm$^2$ and two cycles of duplicative run, with the results shown in Table 4.

Two types of mixing, i.e. premixing and plant mixing, were employed to prepare the above asphalt mixtures. In the case of premixing, a preblend of straight asphalt with thermoplastic elastomer and/or SBR rubber and low molecular weight polypropylene was heated to give a homogeneous composition which was thereafter mixed with an aggregate with heat for 3 minutes. Plant mixing was effected by blending straight asphalt with an aggregate with heat for one minute, followed by incorporation of thermoplastic elastomer and/or SBR rubber and low molecular weight polypropylene and by subsequent heating.

Inventive Examples 9 to 12 show a dynamic stability of more than 4,000 cycles/mm which significantly exceeds that of Comparative Examples 7 and 9. This means that the inventive compositions are sufficiently resistant to fluidity. Despite its acceptable dynamic stability, Comparative Example 8 involves too high a viscosity at 180° C. as appears clear from Comparative Example 2. A similar comparison was made between Inventive Examples 13 to 16 and Comparative Examples 10 to 12. Inventive Examples 13 to 16 are further improved with respect to dynamic stability or durability as compared to Inventive Examples 9 to 12. The inventive compositions when formulated with an open graded asphalt mixture have been found particularly suitable for use in asphalt pavements requiring water penetration and drainage.

Premixing has a tendency to afford higher dynamic stability than does plant mixing. In the practice of the invention, however, sufficient dynamic stability is attainable even with use of plant mixing.

Obviously, various modifications and variations of the present invention are possible in the light of the above teaching. It is therefore to be understood that within the scope of the appended claims the invention may be practiced otherwise than as specifically described.

TABLE 1

| Composition | Inventive Examples | | | | Comparative Examples | | |
|---|---|---|---|---|---|---|---|
| | 1 | 2 | 3 | 4 | 1 | 2 | 3 |
| 80/100 Straight asphalt | 94 | — | 94 | 94 | 96 | — | — |
| 60/80 Straight asphalt | — | 94 | — | — | — | 94 | 94 |
| Thermoplastic elastomer A | 4 | — | 3 | 3 | 4 | 6 | — |
| SBR A | — | — | 1 | 1 | — | — | — |
| SBR B | — | 4 | — | — | — | — | 6 |
| Low molecular weight polypropylene A | 2 | 2 | 2 | — | — | — | — |

TABLE 1-continued

| Composition | Inventive Examples | | | | Comparative Examples | | |
|---|---|---|---|---|---|---|---|
| | 1 | 2 | 3 | 4 | 1 | 2 | 3 |
| Low molecular weight polypropylene B | — | — | — | 2 | — | — | — |
| Degree of penetration (25° C., 0.1 mm) | 45 | 44 | 52 | 46 | 64 | 46 | 56 |
| Softening point (R&B, °C.) | 59.5 | 59.0 | 60.0 | 56 | 50.0 | 70.5 | 56.0 |
| 15° C. Elongation (cm) | 100+ | 100+ | 100+ | 100+ | 100+ | 82 | 100+ |
| 7° C. Elongation (cm) | 41 | 100+ | 100+ | 56 | 87 | 64 | 100+ |
| 60° C. Viscosity (P)*1) | 13,200 | 11,500 | 15,700 | 22,600 | 3,520 | 13,500 | 5,110 |
| 180° C. Viscosity (cSt) | 145 | 217 | 166 | 166 | 151 | 248 | 285 |
| Toughness (kgf.cm)*2) | 133 | 82 | 123 | 142 | 108 | 254 | 92 |
| Tenacity (kgf.cm)*3) | 66 | 80 | 59 | 72 | 64 | 183 | 39 |

Notes:
*1), *2) and *3) determined by the Standard of Japan Asphalt Institute and the other properties by JIS K2207.

TABLE 2

| Composition | Inventive Examples | | | | Comparative Examples | | |
|---|---|---|---|---|---|---|---|
| | 5 | 6 | 7 | 8 | 4 | 5 | 6 |
| 80/100 Straight asphalt | 89 | 89 | 89 | 89 | 92 | 88 | 92 |
| Thermoplastic elastomer A | 8 | 6 | — | 3 | 8 | 12 | — |
| Thermoplastic elastomer B | — | — | 8 | 3 | — | — | 8 |
| SBR A | — | 2 | — | 2 | — | — | — |
| Low molecular weight polypropylene A | 3 | 3 | 3 | 3 | — | — | — |
| Degree of penetration (25° C., 0.1 mm) | 37 | 40 | 36 | 37 | 45 | 42 | 46 |
| Softening point (R&B, °C.) | 83.5 | 82.0 | 112 | 102 | 72.5 | 77.0 | 107 |
| 15° C. Elongation (cm) | 56 | 80 | 50 | 64 | 55 | 51 | 100+ |
| 7° C. Elongation (cm) | 21 | 55 | 35 | 41 | 20 | 19 | 48 |
| 60° C. Viscosity (P)*1) | 222,000 | 118,000 | 950,000 | 720,000 | 29,700 | 122,000 | 530,000 |
| 180° C. Viscosity (cSt) | 329 | 446 | 530 | 502 | 403 | 895 | 556 |
| Toughness (kgf.cm)*2) | 175 | 143 | 311 | 271 | 241 | 235 | 403 |
| Tenacity (kgf.cm)*3) | 73 | 61 | 235 | 191 | 162 | 133 | 331 |

Notes:
See footnotes to Table 1.

TABLE 3

| Asphalt mixture | Dense graded | Open graded |
|---|---|---|
| Mixing temperature (°C.) | 160–170 | 170–180 |
| Hardening temperature (°C.) | 135–145 | 145–155 |
| Asphalt (wt %) | 5.9 | 5.0 |
| No. 6 Macadam (wt %) | 44 | 77 |
| No. 7 Macadam (wt %) | 15 | 2 |
| Coarse sand (wt %) | 15 | 12 |
| Fine sand (wt %) | 20 | 6 |
| Filler (wt %) | 6 | 5 |

TABLE 4

| Example | Composition | Type of asphalt mixture | Mode of mixing | Dynamic stability (cycle/mm) | Voidness (%) |
|---|---|---|---|---|---|
| Inventive Example | Inventive Example | | | | |
| 9 | 1 | dense graded | A | 5,400 | 3.8 |
| 10 | 2 | " | A | 5,100 | 3.9 |
| 11 | 3 | " | A | 6,000 | 4.1 |
| 12 | 4 | " | B | 4,300 | 4.3 |
| Comparative Example | Comparative Example | | | | |
| 7 | 1 | " | A | 1,200 | 3.8 |
| 8 | 2 | " | A | 5,000 | 4.0 |
| 9 | 3 | " | B | 2,400 | 4.1 |
| Inventive Example | Inventive Example | | | | |
| 13 | 5 | open graded | A | 7,000 | 22.8 |
| 14 | 6 | " | A | 5,100 | 23.2 |
| 15 | 7 | " | B | 4,800 | 23.0 |
| 16 | 8 | " | A | 6,600 | 23.3 |
| Comparative Example | Comparative Example | | | | |
| 10 | 4 | " | A | 1,970 | 24.1 |
| 11 | 5 | " | A | 3,500 | 23.2 |
| 12 | 6 | " | A | 2,250 | 23.8 |

Notes:
A - premixing
B - plant mixing

What is claimed is:

1. An asphalt composition for pavement which comprises:

(a) 82% to 96% by weight of an asphalt;

(b) 3% to 12% by weight of a Component (A) selected from the group consisting of a styrene-butadiene block copolymer, a styrene-isoprene block copolymer and a styrene-butadiene rubber; and (c) 1% to 6% by weight of a Component (B) which is a low molecular weight polypropylene having an average molecular weight of 500–10,000, a melting point of 80° C. to 170° C., and a 160° C. viscosity of less than 500 cp.

2. The asphalt composition according to claim 1, wherein said asphalt is a straight asphalt having a 25° C. penetration of 40 to 150 and a softening point of 40° C. to 55° C.

3. The asphalt composition according to claim 1, wherein said Component (A) is a styrene-butadiene block copolymer having a polystyrene block at terminal ends thereof and a polybutadiene block therebetween, a polystyrene ratio of 15% to 40% by weight and an average molecular weight of 5,000 to 200,000.

4. The asphalt composition according to claim 1, wherein said Component (A) is a styrene-butadiene rubber resulting from emulsification polymerization and having a styrene content of 15% to 40% by weight and a Mooney viscosity of 10 to 100.

5. The asphalt composition according to claim 1, wherein said Component (A) is a styrene-butadiene rubber resulting from solution polymerization and having a styrene content of 15% to 40% by weight and a Mooney viscosity of 30 to 80.

6. The asphalt composition according to claim 1, wherein said Component (B) is a low molecular weight polypropylene having an average molecular weight of 2,000 to 5000, a softening point of 120° C. to 150° C., and a 160° C. viscosity of less than 300 cp.

7. The asphalt composition according to claim 1, wherein said asphalt comprises 88% to 95% by weight, said Component (A) comprises 4% to 8% by weight, and said Component (B) comprises 2% to 5% by weight of the total weight of said asphalt composition.

* * * * *